United States Patent
Pyun et al.

(10) Patent No.: US 9,367,036 B2
(45) Date of Patent: Jun. 14, 2016

(54) HIGH SPEED HOLOGRAM RECORDING APPARATUS

(71) Applicant: SAMSUNG ELECTRONICS CO., LTD., Suwon-si (KR)

(72) Inventors: Kyoung-seok Pyun, Seoul (KR); Andrew Putilin, Moscow region (RU); Alexander Morozov, Moscow region (RU); Ivan Bovsunovskiy, Moscow region (RU); Chil-sung Choi, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 261 days.

(21) Appl. No.: 13/838,366

(22) Filed: Mar. 15, 2013

(65) Prior Publication Data

US 2014/0009809 A1 Jan. 9, 2014

(30) Foreign Application Priority Data

Jul. 3, 2012 (RU) ................................ 2012127529
Sep. 5, 2012 (KR) ........................ 10-2012-0098481

(51) Int. Cl.
*G03H 1/30* (2006.01)
*G03H 1/26* (2006.01)
*G03H 1/02* (2006.01)

(52) U.S. Cl.
CPC ... *G03H 1/30* (2013.01); *G03H 1/26* (2013.01)

(58) Field of Classification Search
CPC ......... G03H 1/0005; G03H 1/26; G03H 1/04; G03H 1/0402; G03H 1/0465; G03H 2223/23; G03H 1/30; G03H 2001/0212; G03H 2001/303

USPC ......... 359/3, 9, 10, 11, 21, 22, 24, 25, 27, 28, 359/30, 34

See application file for complete search history.

(56) References Cited

U.S. PATENT DOCUMENTS

| | | | |
|---|---|---|---|
| 6,229,771 B1 * | 5/2001 | Kosoburd et al. | 369/44.23 |
| 7,200,097 B2 * | 4/2007 | Meyrueis et al. | 369/103 |
| 8,605,562 B2 | 12/2013 | Pyun et al. | |
| 2004/0012833 A1 * | 1/2004 | Newswanger et al. | 359/35 |
| 2010/0073747 A1 * | 3/2010 | Su et al. | 359/24 |
| 2011/0228040 A1 | 9/2011 | Blanche et al. | |
| 2013/0050790 A1 | 2/2013 | Sung et al. | |
| 2013/0308170 A1 | 11/2013 | Pyun et al. | |

FOREIGN PATENT DOCUMENTS

| JP | 3652338 B2 | 3/2005 |
|---|---|---|
| KR | 10-2007-0008275 A | 1/2007 |
| KR | 10-2014-0027813 A | 3/2014 |

* cited by examiner

*Primary Examiner* — Jade R Chwasz
(74) *Attorney, Agent, or Firm* — Sughrue Mion, PLLC

(57) ABSTRACT

A hologram recording apparatus is provided, including: a coherent light source; a beam splitter which splits a beam emitted from the coherent light source into a signal beam and a reference beam; a signal beam forming unit including a first optical element which splits the signal beam into a plurality of sub signal beams and deflects the plurality of sub signal beams in different directions. The signal beam forming unit further directs the plurality of sub signal beams onto a hologram recording medium. The recording apparatus also includes a reference beam forming unit which directs the reference onto a location on the hologram recording medium which overlaps with locations on the hologram recording medium on which the plurality of sub signal beams are incident.

20 Claims, 7 Drawing Sheets

HIGH SPEED HOLOGRAM RECORDING APPARATUS

CROSS-REFERENCE TO RELATED APPLICATIONS

This application claims priority from Russian Patent Application No. 2012127529, filed on Jul. 3, 2012, in the Federal Service for Intellectual Property, Patents and Trademarks (Rospatent), and Korean Patent Application No. 10-2012-0098481, filed on Sep. 5, 2012, in the Korean Intellectual Property Office, the disclosure of which are incorporated herein in their entirety by reference.

BACKGROUND

1. Field

Apparatuses consistent with exemplary embodiments relate to apparatuses for recording holograms, and more particularly, to apparatuses for recording holograms at high speed by simultaneously recording a plurality of hogels.

2. Description of the Related Art

Holography is a technology whereby an interference pattern between a signal beam containing a signal and a reference beam is recorded to reproduce the signal as a stereoscopic image. Holography may be used in various fields such as the recording and reproduction of stereoscopic images, the prevention of forgery and the verification of genuine articles, or the recording and reproduction of digital data. In addition, fine interference patterns may be recorded on a flat photosensitive recording film in units of pixels, (or hologram pixels (hogels)), so that a three-dimensional image may be viewed on a two-dimensional plane.

Holograms may be classified as rear projection holograms or reflective holograms. A rear projection micro-hologram is a stereoscopic image formed by light that has been transmitted through a recording film, and a reflective hologram is a stereoscopic image formed by light that has been reflected off a recording film. In particular, a reflective hologram may be used to record/reproduce full-color or full-parallax images and may represent gradation.

Typically, a hologram may be recorded by dividing a beam emitted from a light source into a signal beam and a reference beam, modulating the signal beam, and irradiating the signal beam and the reference beam at the same location on a photosensitive recording film. the signal beam may be modulated by using a spatial light-modulator according to an interference pattern calculated by a computer based on an image that is to be finally reproduced the photosensitive recording film.

To record such holograms at high speed, it is very important to simultaneously record a plurality of hogels that are basic units of holograms. Typically, a method of redundantly installing a plurality of optical elements is used in order to simultaneously record a plurality of hogels. However, this method is likely to increase the manufacturing cost of hologram recording apparatuses and is spatially restrictive.

SUMMARY

One or more exemplary embodiments may provide apparatuses for recording high speed holograms by simultaneously recording a plurality of hogels.

Additional exemplary aspects will be set forth in part in the description which follows and, in part, will be apparent from the description, or may be learned by practice of the presented embodiments.

According to an aspect of an exemplary embodiment, a hologram recording apparatus includes: a coherent light source; a beam splitter for splitting a beam emitted from the coherent light source into a signal beam and a reference beam; a signal beam forming unit including a first optical element for splitting the signal beam into a plurality of sub signal beams and deflecting the plurality of sub signal beams in different directions, and for irradiating the plurality of sub signal beams onto a hologram recording medium to simultaneously record a plurality of hogels at different locations on the hologram recording medium; and a reference beam forming unit for allowing the reference beam to be irradiated onto the hologram recording medium at a location overlapping with the locations at which the plurality of sub signal beams are incident.

The first optical element may include a plurality of refractive regions used to split the incident signal beam into the plurality of sub signal beams and refract the plurality of sub signal beams to be deflected in different directions.

The plurality of refractive regions may each have a thickness which increases with a distance from a center axis of the incident signal beam.

The plurality of refractive regions may each have a thickness which decreases with a distance from a center axis of the incident signal beam.

The first optical element may include m refractive regions, and the plurality of refractive regions may irradiate the plurality of sub signal beams onto the hologram recording medium to simultaneously record m hogels, where n is an integer equal to or greater than 2 and $m=n^2$.

The refractive regions may be in an n×n arrangement where n is an integer equal to or greater than 2.

The first optical element may be configured to split the signal beam into m sub signal beams, and allow the signal beam forming unit to simultaneously record m hogels, wherein n is an integer greater than or equal to 2, and $m=n^2$.

The signal beam forming unit may further include: a spatial light modulator (SLM) for modulating the plurality of sub signal beams formed by the first optical element according to information of each hogel; and a first Fourier transformation optical system for Fourier transforming and focusing the modulated plurality of sub signal beams.

The SLM may be disposed on an optical path between the first optical element and the first Fourier transformation optical system.

The SLM may be a transmissive SLM.

The signal beam forming unit may further include: a correction refractive optical element for correcting the plurality of sub signal beams focused by the first Fourier transformation optical system.

The correction refractive optical element may include a plurality of correction refractive regions in a number corresponding to the plurality of refractive regions of the first optical element, wherein each of the plurality of correction refractive regions may have a thickness which decreases with a distance from an axis corresponding to a center axis of the signal beam.

The signal beam forming unit may further include: a second Fourier transformation optical system for transferring the plurality of sub signal beams corrected by the correction refractive optical element onto the hologram recording medium.

The signal beam forming unit may further include: a beam expanding optical system for expanding a size of the signal beam from the beam splitter and supplying the expanded signal beam to the first optical element.

The signal beam forming unit may further include: a phase mask disposed on an optical path between the beam splitter and the first optical element for adjusting a size and shape of the signal beam and homogenizing an intensity of the signal beam.

The reference beam forming unit may include: a beam shaping device for shaping the reference beam; and a telescopic optical system for adjusting an optical delay and a beam diameter of the reference beam.

The signal beam forming unit may further include: a phase mask disposed on an optical path between the beam splitter and the first optical element for adjusting a size and shape of the signal beam and homogenizing an intensity of the signal beam.

The reference beam forming unit may include: a beam shaping device for shaping the reference beam; and a telescopic optical system for adjusting an optical delay and beam diameter of the reference beam.

The hologram recording apparatus may further include: a location control system for varying spatial locations of hogels on the hologram recording medium.

BRIEF DESCRIPTION OF THE DRAWINGS

These and/or other exemplary aspects an advantages will become apparent and more readily appreciated from the following description of exemplary embodiments, taken in conjunction with the accompanying drawings in which.

DETAILED DESCRIPTION

Figure 1:
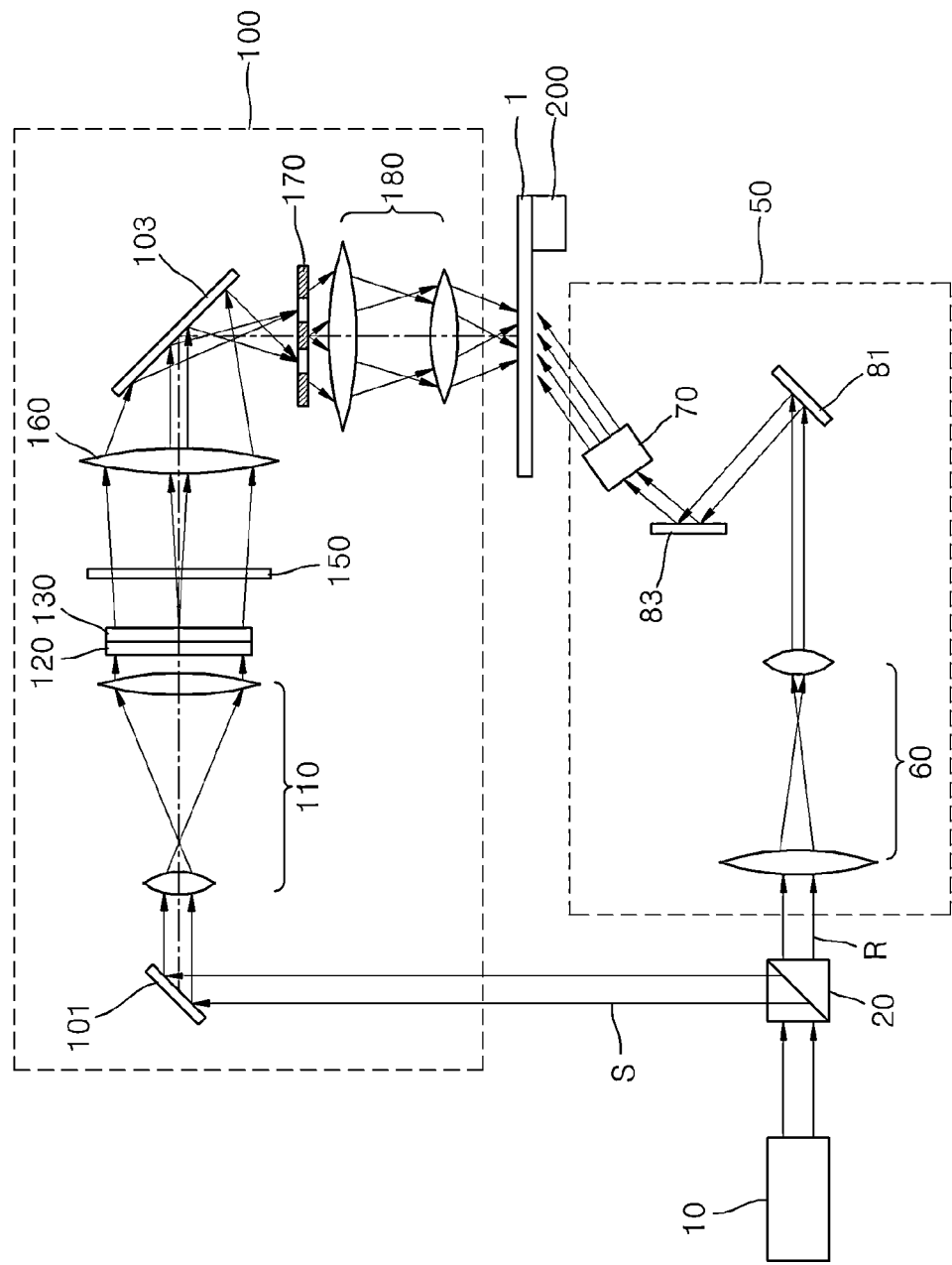
FIG. 1 is a schematic view illustrating the entire optical configuration of a hologram recording apparatus according to an exemplary embodiment.

Reference will now be made in detail to exemplary embodiments, which are illustrated in the accompanying drawings, wherein like reference numerals refer to like elements throughout. In this regard, the exemplary embodiments may have different forms and should not be construed as being limited to the descriptions set forth herein. Accordingly, the embodiments are merely described below, by referring to the figures, to explain aspects of the present description.

A hologram may be recorded by recording an interference pattern generated by dividing a beam emitted from a light source into a signal beam and a reference beam, modulating the signal beam, and irradiating the signal beam and the reference beam onto the same location on a hologram recording medium, for example, a photosensitive recording film. In this regard, a signal beam may be modulated using a spatial light-modulator (SLM) according to an interference pattern calculated by a computer based on an image that is to be finally reproduced from the hologram recording medium.

Also, to increase the resolution of a hologram while recording a hologram having a large area, the hologram may be recorded in a hogel unit that is a basic unit of the hologram. A hogel may have a width of, for example, several hundreds of μm (micro-meters).

In order to record a first hogel of a plurality of hogels, information regarding the first hogel is input into the SLM, and an interference pattern of a signal beam and a reference beam modulated by the information for the first hogel is recorded.

A second hogel is recorded according to the following operations. First, a hologram recording medium is moved in accordance with a location in which information regarding the next hogel is to be recorded. Next, information for the second hogel is input to the SLM, the laser is irradiated onto the hologram recording medium, and an interference pattern of a signal beam and a reference beam modulated by the information for the second hogel is recorded on the hologram recording medium.

The above-described operations are sequentially repeated to record a plurality of hogels. However, it takes time to stabilize an apparatus, such as the time needed to move a hologram recording medium and to reduce vibration due to the movement of the hologram recording medium, in order to move the hologram recording medium and record a new hogel. Thus, the time for moving and stabilizing the hologram recording medium is necessary, in addition to the time for recording a single hogel, and accordingly, a considerable amount of time may be needed to record an entire hologram.

A hologram recording apparatus according to an exemplary embodiment described below is configured to simultaneously record a plurality of hogels, thereby recording a large area of hologram at a high speed.

FIG. 1 is a schematic view illustrating the entire optical configuration of a hologram recording apparatus according to an exemplary embodiment.

Referring to FIG. 1, the hologram recording apparatus according to an exemplary embodiment may include a coherent light source 10, a beam splitter 20 that splits light emitted from the coherent light source 10 into a signal beam S and a reference beam R, a signal beam forming unit 100 that separates the signal beam S, split by the beam splitter 20, into a plurality of sub signal beams and irradiates the plurality of sub signal beams onto a photosensitive material, i.e., a hologram recording medium 1 and simultaneously records a plurality of hogels at different locations, and a reference beam forming unit 50 that irradiates the reference beam R, split by the beam splitter 20, onto the hologram recording medium 1 at a location overlapping the locations at which the plurality of sub signal beams are incident, and records coherent patterns of the signal beam S and the reference beam R on the hologram recording medium 1. The hologram recording apparatus may further include a location control system 200 that moves the hologram recording medium 1 based on a recording location on the hologram recording medium 1.

The coherent light source 10 may include a laser light source capable of emitting coherent light, and may perform modulation in time of a radiation flux. The laser light source in the coherent light source 10 may be, for example, a continuous wave (CW) laser, a quasi-CW laser, or a pulse wave laser. A laser light source that is a CW laser or a quasi-CW laser may be relatively inexpensive compared to a laser light source that is a pulse wave laser. The coherent light source 10 may further include appropriate auxiliary devices capable of adjusting the intensity of the output light over time or adjusting a waveform and a cycle of the output light.

The beam splitter 20 may split the laser beam emitted from the coherent light source 10 into the reference beam R and the signal beam S. The beam splitter 20 may, for example, reflect about 50% of incident light to allow the reflected incident light to reach the signal beam forming unit 100 and may transmit the remaining incident light to allow the transmitted incident light to reach the reference beam forming unit 50. In this regard, a division ratio of the signal beam S and the reference beam R may vary. An optical system may be configured to allow a beam reflected by the beam splitter 20 to reach the reference beam forming unit 50 and to allow a beam transmitted through the beam splitter 20 to reach the signal beam forming unit 100. Further, the beam splitter 20 may be a polarization beam splitter that transmits or reflects portions of an incident beam according to their polarization. In this case, the hologram recording apparatus may further include a polarization changer, for example, a half wave plate, that changes polarization of the transmitted beam or the reflected beam so as to make the polarization of the transmitted beam and the reflected beam consistent with each other.

The signal beam forming unit 100 separates the signal beam S that has been split by the beam splitter 20 into a plurality of sub signal beams and irradiates the plurality of sub signal beams, each including hogel information, onto the hologram recording medium 1, and thus, a plurality of hogels may be simultaneously recorded at different locations of the hologram recording medium 1.

The signal beam forming unit 100 includes a first optical element 130 that splits an incident signal beam into a plurality of sub signal beams and deflects the plurality of sub signal beams in different directions. The signal beam forming unit 100 may further includes a spatial light modulator (SLM) 150 that modulates each of the plurality of sub signal beams formed by the first optical element 130 according to information for each hogel, and a first Fourier transformation optical system 160 that Fourier transforms and focuses each of the modulated plurality of sub signal beams. The SLM 150 may be disposed between the first optical element 130 and the first Fourier transformation optical system 160. The signal beam forming unit 100 may further include a beam expanding optical system 110 that expands a size of the signal beam S from the beam splitter 20 and supplies the expanded signal beam S to the first optical element 130. The signal beam forming unit 100 may further include a phase mask 120 between the beam splitter 20 and the first optical element 130 that adjusts a size and shape of the signal beam S and homogenizes the intensity of the signal beam S. The signal beam forming unit 100 may further include at least one of reflection mirrors 101 and 103 that adjust a path of the signal beam S and/or the plurality of sub signal beams.

The beam expanding optical system 110 may expand the signal beam S to a size corresponding to an effective light modulation region of the first optical element 130 and the SLM 150 and may include, for example, a plurality of optical devices including lenses. For example, the beam expanding optical system 110 may include a pair of convex lenses as shown in FIG. 1.

The phase mask 120 is used to change the cross-sectional shape of the signal beam S incident on the first optical element 130 to a desired shape and allow the signal beam S to have a uniform intensity, and may change the cross-sectional shape of the signal beam S, for example, from a circular shape to a rectangular shape. In this case, the first optical element 130 is configured to split the signal beam S having a rectangular shape into a plurality of sub signal beams while maintaining the rectangular shape of each of the sub signal beams, and thus, each of the plurality of hogels may have a rectangular shape, which reduces spaces between the plurality of hogels. That is, as will be described with reference to FIGS. 2 and 3 below, in a case in which the first optical element 130 is configured to split the signal beam S into four sub signal beams, the first optical element 130 may split the signal beam S into four rectangular sub signal beams S1, S2, S3, and S4 in a 2×2 arrangement, as shown in FIG. 4, by segmentation. FIG. 4 exemplarily shows the four rectangular sub signal beams S1, S2, S3, and S4 arranged in a 2×2 arrangement obtained in a case in which the first optical element 130 is configured to split the signal beam S into four sub signal beams. For another example, in a case where the first optical element 130 is configured to split the signal beam S into nine sub signal beams, the first optical element 130 may split the signal beam S into nine rectangular sub signal beams arranged in a 3×3 arrangement by segmentation.

The first optical element 130 is a refractive optical element and may include a plurality of refractive regions that split the incident signal beam S into a plurality of sub signal beams and refract the plurality of sub signal beams to be deflected in different directions. In this regard, the number of the plurality of refractive regions of the first optical element 130 may correspond to the square (i.e., 22, 32, 42, etc.) of an integer equal to or greater than 2, and the other elements of the hologram recording apparatus may be correspondingly designed. That is, the plurality of refractive regions may have an n×n arrangement (wherein n is an integer equal to or greater than 2). Thus, the signal beam forming unit 110 may irradiate the plurality of sub signal beams onto the hologram recording medium 1 to simultaneously record a plurality of hogels in a number corresponding to the square of the integer equal to or greater than 2 and in an n×n arrangement (wherein n is an integer equal to or greater than 2).

Figure 2:
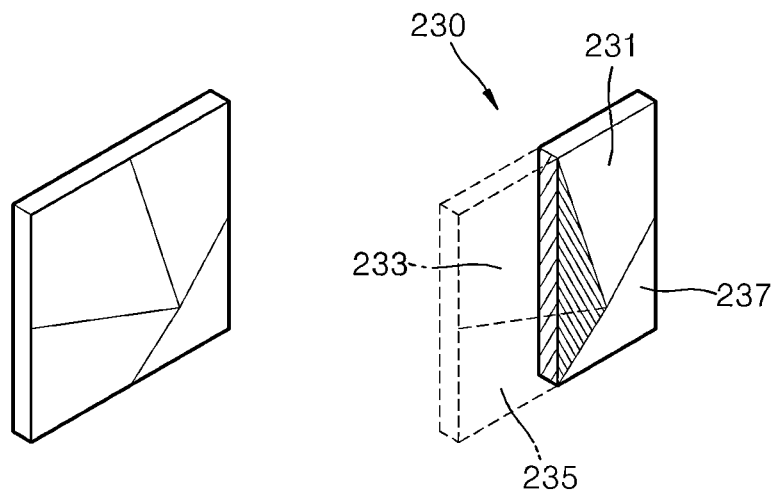
FIGS. 2 and 3 show examples of a first optical element applicable in the hologram recording apparatus of FIG. 1.

In this regard, thicknesses of the plurality of refractive regions may be relatively smaller closer to a center axis of the incident signal beam S and greater farther from the center axis thereof as shown in FIG. 2 in such a way that the incident signal beam S is split into the plurality of sub signal beams and the plurality of sub signal beams are deflected in different directions. Also, the thicknesses of the plurality of refractive regions may be relatively greater closer to the center axis of the incident signal beam S and smaller farther from the center axis thereof as shown in FIG. 3.

Figure 3:
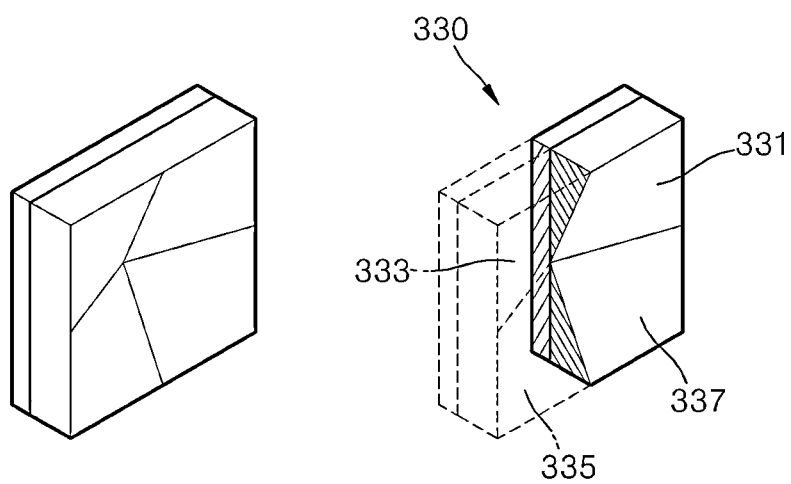
Figure 4:
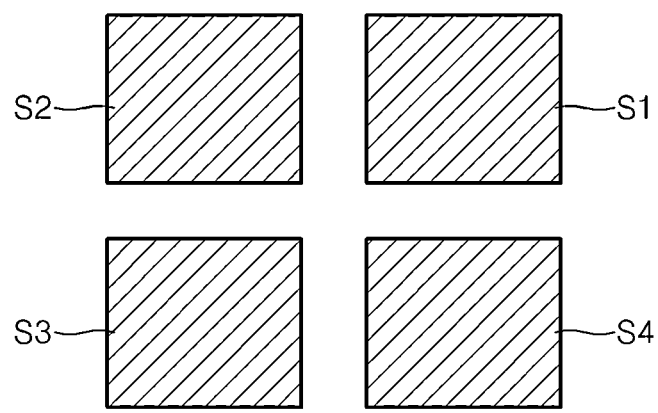
FIG. 4 exemplarily shows four rectangular signal beams in a 2×2 arrangement in a case in which a first optical element is configured to split a signal beam into the four signal beams.

FIGS. 2 and 3 show examples of first optical elements 230 and 330, which each may be used as the first optical element 130 of FIG. 1. Referring to FIG. 2, the first optical element 230 may include first through fourth refractive regions 231, 233, 235, and 237 having thicknesses relatively smaller closer to the center axis of the incident signal beam S and greater farther from the center axis thereof and positioned in a 2×2 arrangement. Referring to FIG. 3, the first optical element 330 may include first through fourth refractive regions 331, 333, 335, and 337 having thicknesses relatively greater closer to the center axis of the incident signal beam S and smaller farther from the center axis thereof and positioned in a 2×2 arrangement.

In a case in which the first optical elements 230 and 330 each having the four refractive regions 231, 233, 235, and 237 and 331, 333, 335, and 337 of FIGS. 2 and 3 are used as the first optical element 130 of FIG. 1, the other elements of the hologram recording apparatus are correspondingly designed, and four hogels may be simultaneously recorded onto the hologram recording medium 1. As another example, each of the first optical elements 230 and 330 may have nine refractive regions. In this case, nine hogels may be simultaneously recorded onto the hologram recording medium 1.

In the hologram recording apparatus according to an exemplary embodiment of the present invention, the number of hogels that are simultaneously recorded onto the hologram recording medium 1 may vary according to how many sub beams the first optical element 130 is configured to split the signal beam S into.

Referring back to FIG. 1, the SLM 150 modulates the signal beam S according to an interference pattern calculated by a computer based on an image or information that is to be ultimately reproduced. That is, the SLM 150 modulates the signal beam S according to information for each hogel. In a case in which hogels in the number corresponding to the square of the integer equal to or greater than 2 are simultaneously recorded onto the hologram recording medium 1, the SLM 150 may modulate each of the plurality of sub signal beams to simultaneously record the hogels.

The SLM 150 may be a transmissive SLM. Alternately, the SLM 150 may be a reflective SLM. In this case, an arrangement of the other elements of the signal beam forming unit 100 may be modified, and additional optical devices may be used to change a path or correct a beam distortion.

The first Fourier transformation optical system 160 changes curves of wavefronts of the plurality of sub signal beams modulated by the SLM 150, Fourier transforms and focuses the plurality of signal beams. The first Fourier transformation optical system 160 may include a single lens as shown in FIG. 1 or a plurality of optical elements. The first Fourier transformation optical system 160 may include a holographic Fourier transformation device.

The signal beam forming unit 100 may further include a correction refractive optical element 170 that corrects the plurality of sub signal beams focused by the first Fourier transformation optical system 160. Also, the signal beam forming unit 100 may further include a second Fourier transformation optical system 180 that transfers the plurality of sub signal beams corrected by the correction refractive optical element 170 to the hologram recording medium 1.

The correction refractive optical element 170 may include a plurality of correction refractive regions in a number and arrangement corresponding to the number and arrangement of the plurality of refractive regions of the first optical element 130. In this regard, thicknesses of the correction refractive region may be relatively greater closer to an axis corresponding to the center axis of the incident signal beam S and smaller farther from the corresponding axis.

Although FIG. 1 illustrates an example in which the first Fourier transformation optical system 160 primarily collects the plurality of signal beams modulated by the SLM 150, and the correction refractive optical element 170 and the second Fourier transformation optical system 180 are further included to correct and focus the plurality of sub signal beams, the first Fourier transformation optical system 160 may be configured to directly focus the modulated plurality of sub signal beams onto the hologram recording medium 1.

According to the above-described signal beam forming unit 100, the signal beam split by the beam splitter 20 is transformed in the plurality of sub signal beams in the signal beam forming unit 100 which are focused on the hologram recording medium 1.

Figure 5:
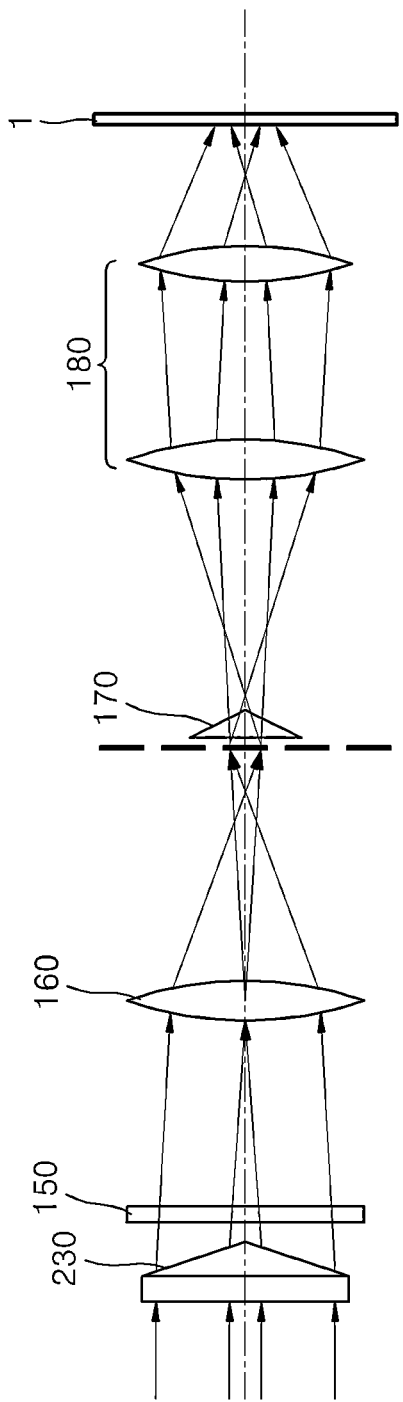
FIG. 5 shows light travel paths in a signal beam forming unit when a first optical element of FIG. 2 is used as the first optical element of FIG. 1.
Figure 6:
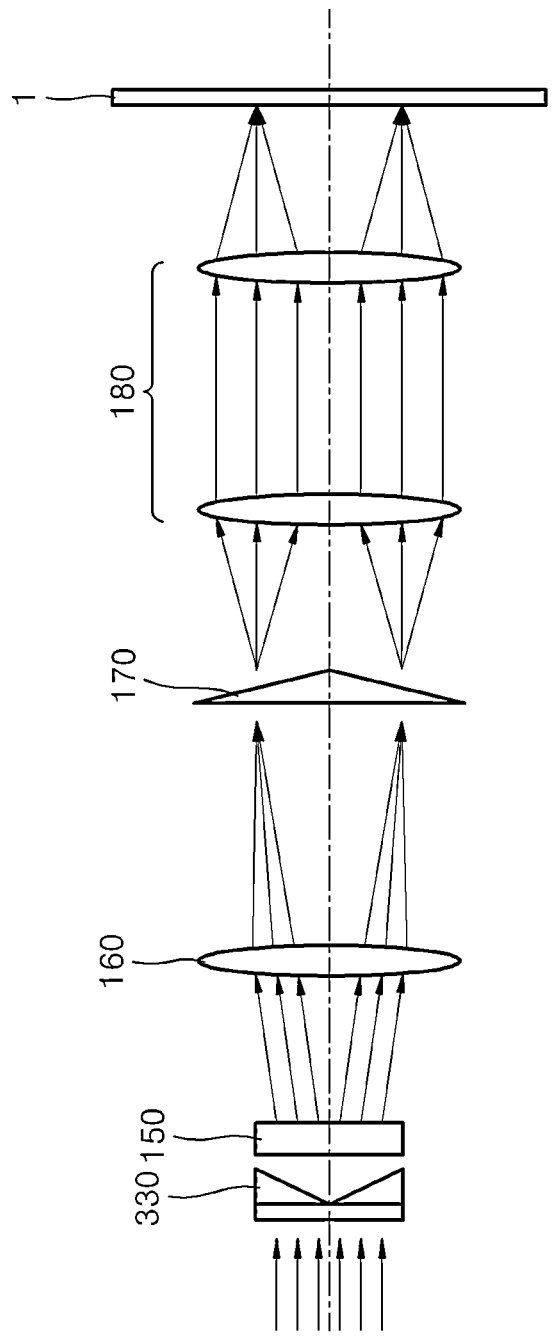
FIG. 6 shows light travel paths in a signal beam forming unit when a first optical element of FIG. 3 is used as the first optical element of FIG. 1.

FIG. 5 shows travel paths of the plurality of sub signal beams split by the first optical element 230 and deflected in different directions in the signal beam forming unit 100 when the first optical element 230 of FIG. 2 is used as the first optical element 130. FIG. 6 shows travel paths of the plurality of sub signal beams split by the first optical element 330 and deflected in different directions in the signal beam forming unit 100 when the first optical element 330 of FIG. 3 is used as the first optical element 130.

Referring to FIG. 1, the reference beam forming unit 50 transfers the reference beam split by the beam splitter 20 to the hologram recording medium 1.

The reference beam forming unit 50 may include a beam shaping device 70 that shapes the reference beam R and a telescopic optical system that adjusts an optical delay and beam diameter of the reference beam R. The beam shaping device 70 may be configured to shape the reference beam R in accordance with a shape of the signal beam S irradiated onto the hologram recording medium 1, for example, into a rectangular beam shape. The beam shaping device 70 may use a hologram device. The telescopic optical system may include a relay lens 60 that adjusts the beam diameter of the reference beam R and at least one of mirrors 81 and 83 that adjust the optical delay and travel path of the reference beam R.

Meanwhile, the hologram recording apparatus according to an exemplary embodiment may further include a location control system 200 that controls the relative arrangements of the hologram recording medium 1 and other elements thereof and moves the hologram recording medium 1 according to a recording location on the hologram recording medium 1. The hologram recording apparatus may further include an electronic control unit that controls at least one of the coherent light source 10, the SLM 150, and the location control system 200. The electronic control unit may include an interface block for interfacing with external information sources.

The above-described hologram recording apparatus according to an exemplary embodiment may irradiate the plurality of sub signal beams onto the hologram recording medium 1 and irradiate the reference beam R to be overlapped with the plurality of signal beams, thereby simultaneously recording a plurality of hogels.

Figure 7A:
FIG. 7A shows an example of four hogels that are simultaneously recorded.
Figure 7B:
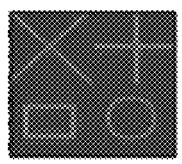
FIG. 7B shows a state of light modulation performed by a spatial light modulator (SLM) to form four hogels of FIG. 7A.
Figure 7C:
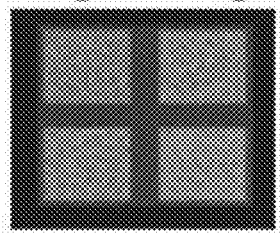
FIG. 7C shows four hogels in an 2×2 arrangement which are simultaneously recorded onto a hologram recording medium when a signal beam incident on the hologram recording medium via a first optical element having four refractive regions in the 2×2 arrangement is split in four signal beams and is input to the SLM of FIG. 7B.

For example, in a case in which four hogels are simultaneously recorded as shown in FIG. 7A, the SLM 150 may modulate light as shown in FIG. 7B. When the signal beam S incident via the first optical element 230 or 330 having the four refractive regions in the 2×2 arrangement as shown in FIG. 2 or 3 is split in the four signal beams S1, S2, S3, and S4 as shown in FIG. 4 and is input to the SLM 150 of FIG. 7B, four hogels in an 2×2 arrangement are simultaneously recorded onto the hologram recording medium 1 as shown in FIG. 7C.

Figure 8:
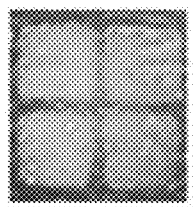
FIG. 8 shows an experiment result obtained by actually recording four hogels by using the first optical element of FIG. 3.

FIG. 8 shows an experiment result obtained by actually recording four hogels by using the first optical element 330 of FIG. 3.

The above-described hologram recording apparatus according to an exemplary embodiment may irradiate a plurality of sub signal beams onto the hologram recording medium 1 and irradiate the reference beam R to be overlapped with the plurality of sub signal beams, thereby simultaneously recording a plurality of hogels. A recording time may be reduced according to the number of hogels that are simultaneously recorded, thereby achieving high speed hologram recording.

As described above, according to the one or more of the exemplary embodiments, a hologram recording apparatus is capable of simultaneously recording a plurality of hogels, thereby recording a hologram at high speed. Also, the hologram recording apparatus uses relatively small optical elements, thereby reducing the manufacturing cost of the hologram recording apparatus.

It should be understood that the exemplary embodiments described herein should be considered in a descriptive sense only and not for purposes of limitation. Descriptions of features or aspects within each embodiment should typically be considered as available for other similar features or aspects in other embodiments.

What is claimed is:

1. A hologram recording apparatus comprising:
   a coherent light source;
   a beam splitter which splits a beam emitted from the coherent light source into a signal beam and a reference beam;
   a signal beam forming unit comprising a first optical element which splits the signal beam into a plurality of sub signal beams and deflects each of the plurality of sub signal beams in a different direction, wherein the signal beam forming unit further directs the plurality of sub signal beams onto a plurality of different locations, respectively, on a hologram recording medium, such that each of the plurality of sub signal beams is incident on the hologram recording medium at the same angle; and
   a reference beam forming unit which directs the reference beam onto a location on the hologram recording medium which overlaps with the plurality of different locations on the hologram recording medium on which the plurality of sub signal beams are incident;
   wherein the overlapping of the plurality of sub signal beams and the reference beam on the hologram recording medium simultaneously records a plurality of hogels at the plurality of different locations on the hologram recording medium.

2. The hologram recording apparatus of claim 1, wherein the first optical element comprising a plurality of refractive regions which split the signal beam into the plurality of sub signal beams and which refracts each of the plurality of signal beams to be deflected in different directions.

3. The hologram recording apparatus of claim 2, wherein each of the plurality of refractive regions has a thickness which increases with a distance from a center axis of the signal beam.

4. The hologram recording apparatus of claim 2, wherein each of the plurality of refractive regions has a thickness which decreases with a distance from the center axis of the signal beam.

5. The hologram recording apparatus of claim 2, wherein the first optical element comprises m refractive regions, and the overlapping of the plurality of sub signal beams and the reference beam on the hologram recording medium simultaneously records m hogels on the hologram recording medium; wherein n is a an integer equal to or greater than 2 and $m=n^2$.

6. The hologram recording apparatus of claim 2, wherein the plurality of refractive regions are arranged in an n×n arrangement, wherein n is an integer equal to or greater than 2.

7. The hologram recording apparatus of claim 1, wherein the first optical element splits the signal beam into m sub signal beams, and the overlapping of the plurality of sub signal beams and the reference beam on the hologram recording medium simultaneously records m hogels on the hologram recording medium; wherein n is a an integer equal to or greater than 2 and $m=n^2$.

8. The hologram recording apparatus of claim 1, wherein the signal beam forming unit further comprises:
   a spatial light modulator (SLM) which modulates the plurality of sub signal beams according to information of each of the plurality of hogels; and
   a first Fourier transformation optical system which Fourier transforms and focuses the modulated plurality of sub signal beams.

9. The hologram recording apparatus of claim 8, wherein the SLM is disposed on an optical path between the first optical element and the first Fourier transformation optical system.

10. The hologram recording apparatus of claim 8, wherein the SLM is a transmissive SLM.

11. The hologram recording apparatus of claim 8, wherein the signal beam forming unit further comprises: a correction refractive optical element which corrects the plurality of sub signal beams focused by the first Fourier transformation optical system.

12. The hologram recording apparatus of claim 11, wherein the correction refractive optical element comprises a plurality of correction refractive regions in a number corresponding to the plurality of refractive regions of the first optical element, and each of the plurality of refractive regions has a thickness which decreases with a distance from an axis corresponding to a center axis of the signal beam.

13. The hologram recording apparatus of claim 11, wherein the signal beam forming unit further comprises: a second Fourier transformation optical system which transmits the plurality of sub signal beams from the correction refractive optical element onto the hologram recording medium.

14. The hologram recording apparatus of claim 8, wherein the signal beam forming unit further comprises: a beam expanding optical system which expands a size of the signal beam from the beam splitter and transmits the expanded signal beam to the first optical element.

15. The hologram recording apparatus of claim 8, wherein the signal beam forming unit further comprises: a phase mask, disposed on an optical path between the beam splitter and the first optical element, which adjusts a size and a shape of the signal beam and homogenizes an intensity of the signal beam.

16. The hologram recording apparatus of claim 8, wherein the reference beam forming unit comprises:
   a beam shaping device which shapes the reference beam; and
   a telescopic optical system which adjusts an optical delay and a beam diameter of the reference beam.

17. The hologram recording apparatus of claim 1, wherein the signal beam forming unit further comprises: a phase mask, disposed on an optical path between the beam splitter and the first optical element, which adjusts a size and a shape of the signal beam and homogenizes an intensity of the signal beam.

18. The hologram recording apparatus of claim 1, wherein the reference beam forming unit comprises:
   a beam shaping device which shapes the reference beam; and
   a telescopic optical system which adjusts an optical delay and a beam diameter of the reference beam.

19. The hologram recording apparatus of claim 1, further comprising: a location control system which varies spatial locations of the hogels on the hologram recording medium.

20. A hologram recording apparatus comprising:
a coherent light source;
a beam splitter which splits a beam from the coherent light source into a signal beam and a reference beam;
a signal beam unit which splits the signal beam into a plurality of sub signal beams and deflects each of the plurality of sub signal beams in a different direction, modulates the plurality of sub-signal beams, and directs the modulated plurality sub signal beams onto a plurality of different locations, respectively, on a hologram recording medium, such that each of the modulated plurality of sub-signal beams is incident on the hologram recording medium at the same angle; and
a reference beam unit which directs the reference beam onto a location on the hologram recording medium which overlaps simultaneously with the plurality of different locations of the hologram recording medium on which the plurality of sub signal beams are incident;
wherein the overlapping of the plurality of sub signal beams and the reference beam on the hologram recording medium simultaneously records a plurality of hogels at the plurality of different locations on the hologram recording medium.

* * * * *